United States Patent
Chuang et al.

(10) Patent No.: US 10,168,235 B1
(45) Date of Patent: Jan. 1, 2019

(54) STRETCHABLE PIEZOELECTRIC SENSOR APPLIED TO LOGISTICS FOR REAL-TIME MONITORING

(71) Applicant: SOUTHERN TAIWAN UNIVERSITY OF SCIENCE AND TECHNOLOGY, Tainan (TW)

(72) Inventors: Cheng Hsin Chuang, Tainan (TW); Wan Jung Chang, Tainan (TW); Chung Lin Huang, Tainan (TW); Jian Ping Su, Tainan (TW); Cheng An Wang, Tainan (TW)

(73) Assignee: Southern Taiwan University of Science and Technology, Tainan (TW)

( * ) Notice: Subject to any disclaimer, the term of this patent is extended or adjusted under 35 U.S.C. 154(b) by 0 days.

(21) Appl. No.: 15/637,240

(22) Filed: Jun. 29, 2017

(51) Int. Cl.
| | |
|---|---|
| *G06Q 50/28* | (2012.01) |
| *B65D 77/00* | (2006.01) |
| *G01L 1/16* | (2006.01) |
| *B65D 79/02* | (2006.01) |
| *G01L 5/00* | (2006.01) |

(52) U.S. Cl.
CPC .............. *G01L 1/16* (2013.01); *B65D 79/02* (2013.01); *G01L 5/0052* (2013.01)

(58) Field of Classification Search
CPC .............. G01N 29/041; G01N 29/44; G01N 2291/0231; G01N 2291/0423; G01N 29/2437; G01N 29/2418; G01N 2291/0289; G01N 29/0609; G01N 29/07; G01N 29/245; G01N 29/2493; G01N 29/4418; G01N 2291/011; G01N 2291/02491; G01N 2291/0422; G01N 2291/0427; B64F 5/60; B64D 2045/0085; G01H 9/004; G01H 11/08; G01H 11/00; G01M 5/0066; G01M 11/086; G01M 5/0033
See application file for complete search history.

(56) References Cited

U.S. PATENT DOCUMENTS

| | | | | |
|---|---|---|---|---|
| 7,373,260 | B2* | 5/2008 | Kessler | G01B 5/30 702/35 |
| 2014/0049137 | A1* | 2/2014 | Ando | G01B 7/16 310/330 |
| 2016/0306393 | A1* | 10/2016 | Huitema | G06F 3/0346 |
| 2016/0324431 | A1* | 11/2016 | Ng | A61B 5/0816 |

FOREIGN PATENT DOCUMENTS

| | | | |
|---|---|---|---|
| CN | 202414432 U | * | 9/2012 |
| TW | 557680 B1 | * | 11/2016 |
| TW | 201714141 A | * | 4/2017 |

\* cited by examiner

*Primary Examiner* — Harshad R Patel
*Assistant Examiner* — Brandi Hopkins
(74) *Attorney, Agent, or Firm* — Rosenberg, Klein & Lee

(57) ABSTRACT

A stretchable piezoelectric sensor applied to logistics for real-time monitoring includes a stretchable flexible substrate and a conductive layer formed on the flexible substrate. A plurality of sensing members corresponding in number to end faces of a packaging box is adhered to the conductive layer. When the piezoelectric sensor is placed at the bottom of the packaging box containing goods, two ends of the piezoelectric sensor can be stretched to fit on the diagonal corners of the packaging box, and the sensing members are located on the respective end faces of the packaging box to achieve an all-round monitoring.

3 Claims, 4 Drawing Sheets

STRETCHABLE PIEZOELECTRIC SENSOR APPLIED TO LOGISTICS FOR REAL-TIME MONITORING

FIELD OF THE INVENTION

The present invention relates to a piezoelectric sensor, and more particularly to a stretchable piezoelectric sensor which can be quickly bound to a packaging box containing goods to detect whether the goods are thrown or pressed heavily or unsealed during transportation.

BACKGROUND OF THE INVENTION

Taiwan Patent No. I289795 discloses a radio frequency tag provided with an electronic seal to prevent goods from being exchanged or lost and a tracking system by using the radio frequency tag to identify the condition of the electronic seal. However, the electronic seal is unable to know the condition of the goods or to clarify the attribution of responsibility when the goods are damaged. Taiwan Utility Model No. M483492 discloses an impact indicator and a logistics monitoring and management system having the impact indicator. When the goods coupled with the impact indicator are impacted or shaken, the impact indicator will present a permanent color change. However, the system needs to take pictures and upload information, which consumes time and manpower. Taiwan Patent No. I484440 discloses a method and a system for logistics delivery and identification to prevent an imposter from getting the goods or to prevent logistics personnel from privately taking possession of the goods. However, this system is unable to know the condition of the goods or to clarify the attribution of responsibility when the goods are damaged.

In order to solve the shortcomings of the prior art, the inventor of the present invention filed an application in 2015 and attained Taiwan Patent No. I557680 tilted "logistics monitoring system by using piezoelectric sensing label". A piezoelectric sensing label is affixed to the top or bottom of the goods, so that the piezoelectric sensing label on the goods can be scanned at the logistics station by using a scanner for recording the goods. During the carrying or transportation of the goods, the piezoelectric value detected by the piezoelectric sensing label is transmitted to a vehicle, and then the vehicle transmits a signal to a cloud management system for monitoring the goods instantaneously. This way can clarify the attribution of responsibility when the goods are damaged. However, the piezoelectric sensing label is affixed to the sealed portion of the packaging box containing the goods, that is, the top or the bottom of the packaging box containing the goods. If the other end faces of the packaging box are damaged, it may have a flaw in monitoring. Although the piezoelectric sensing labels can be affixed to the six end faces of the packaging box to achieve an all-round monitoring, it is required to affix the piezoelectric sensing labels one by one to the respective end faces of the packaging box. When the piezoelectric sensing label is affixed to the bottom of the packaging box, it may cause great inconvenience of operation because the goods are too heavy and the packaging box cannot be overturned. Accordingly, the inventor of the present invention has devoted himself based on his many years of practical experiences to solve these problems.

SUMMARY OF THE INVENTION

In view of the shortcomings of the conventional piezoelectric sensing label invented by the inventor of the present invention, the primary object of the present invention is to provide an annular flexible piezoelectric sensor. The piezoelectric sensor can be quickly coupled to a packaging box containing goods by means of a stretching operation.

In order to achieve the aforesaid object, a stretchable piezoelectric sensor applied to logistics for real-time monitoring is provided. The stretchable piezoelectric sensor is in the form of a ring, and comprises a stretchable flexible substrate and a conductive layer formed on the flexible substrate. A plurality of sensing members corresponding in number to end faces of a packaging box is adhered to the conductive layer. When two ends of the piezoelectric sensor are stretched and fitted on diagonal corners of the packaging box, the sensing members are located on the respective end faces of the packaging box.

Based on the aforesaid, when the annular piezoelectric sensor is placed at the bottom of the packaging box containing goods, the two ends of the piezoelectric sensor can be stretched to fit on the diagonal corners of the packaging box and the piezoelectric sensor is bound to the packaging box by one-time operation. After bound, the sensing members of the piezoelectric sensor are located on the respective end faces of the packaging box, thereby simplifying the operation process and providing an all-round monitoring effect.

DETAILED DESCRIPTION OF THE PREFERRED EMBODIMENTS

Embodiments of the present invention will now be described, by way of example only, with reference to the accompanying drawings.

Figure 1:
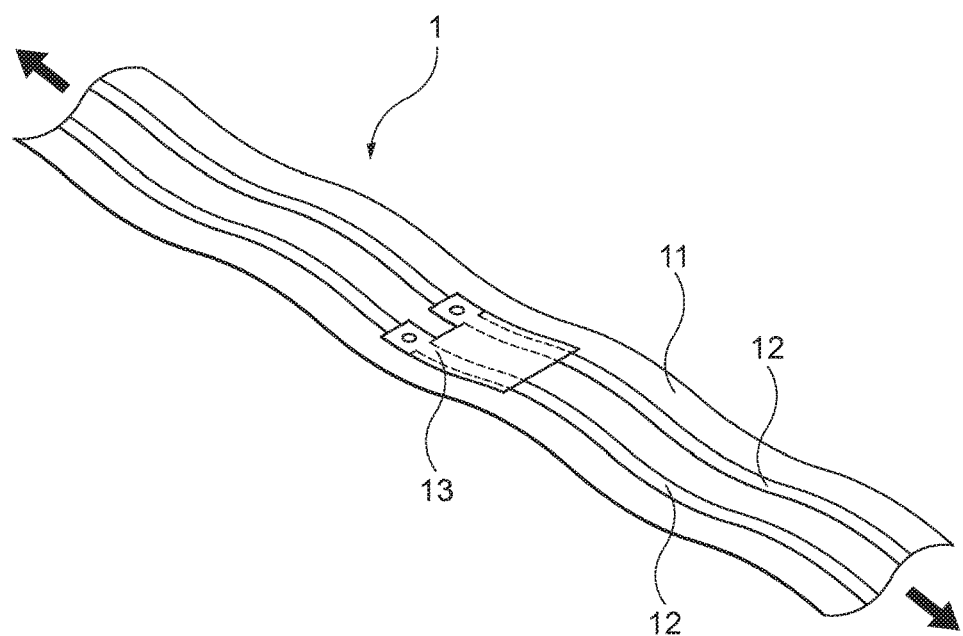
FIG. 1 is a perspective view in accordance with a preferred embodiment of the present invention.

First, referring to FIG. 1, a piezoelectric sensor 1 in accordance with a preferred embodiment of the present invention is in the form of a ring, and comprises a stretchable flexible substrate 11 and a conductive layer 12 deposited or coated on the flexible substrate 11 as an electrode layer for transmitting charge. Preferably, the flexible substrate 11 is a flexible printed circuit board and is soldered with a pin. A plurality of sensing members 13 corresponding in number to end faces 22 of a packaging box 2 (not shown in the drawing) are adhered to the conductive layer 12 through an anisotropic conductive film. Upper and lower end faces of the piezoelectric sensor 1 are respectively enclosed with polyethylene terephthalate (PET) through an optical adhesive to form the piezoelectric sensor 1.

Figure 2:
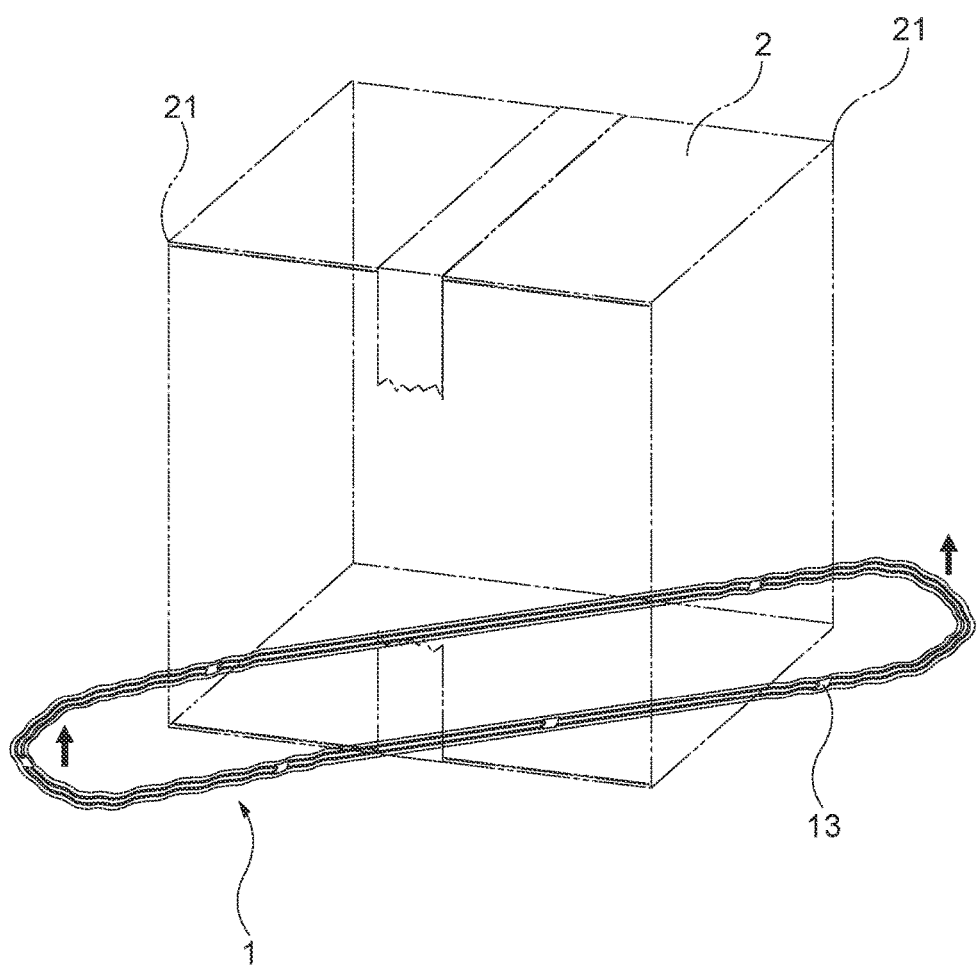
FIG. 2 and FIG. 3 are schematic views in accordance with the preferred embodiment of the present invention when in use.
Figure 3:
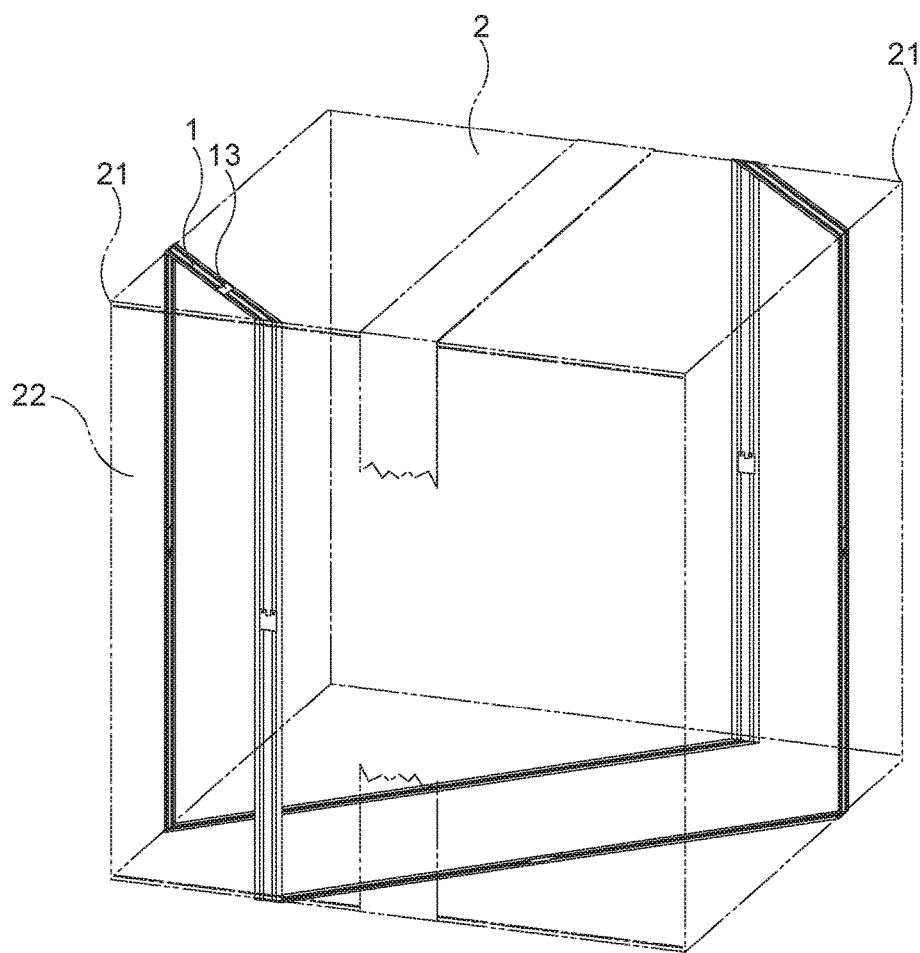

Referring to FIG. 1 and FIG. 2, after a packaging box 2 containing goods is sealed with an adhesive tape, the bottom of the packaging box 2 is placed over the piezoelectric sensor 1 and then two ends of the piezoelectric sensor 1 are stretched and fitted on diagonal corners 21 of the packaging box 2 (as indicated by the arrows of FIG. 2), such that the piezoelectric sensor 1 is bound and fitted on the packaging box 2, and the sensing members 13 are located on the respective end faces 22 of the packaging box 2 (as shown in FIG. 3), thereby fully monitoring the condition of the goods.

Figure 4:
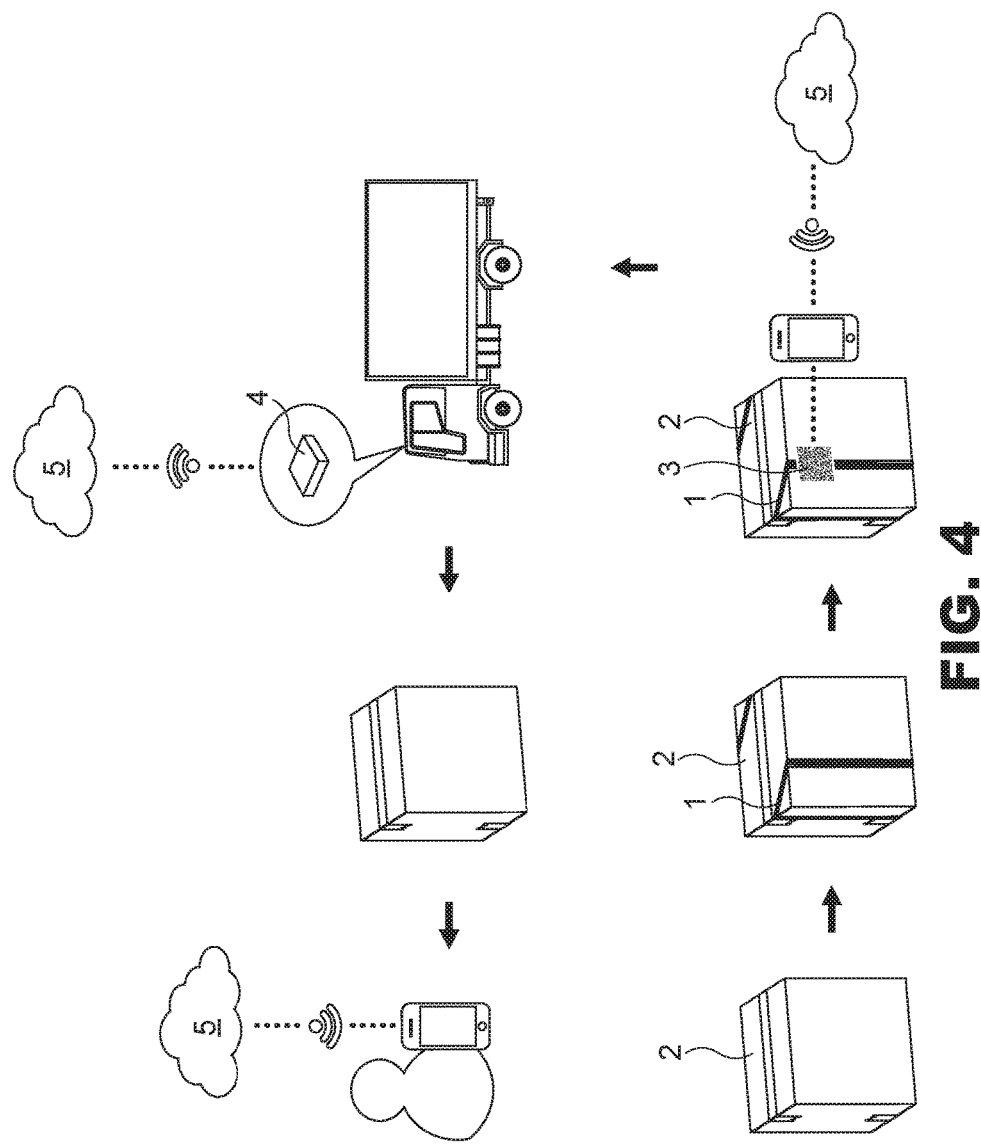
FIG. 4 is a schematic view showing the real-time monitoring of the present invention.

Referring to FIG. 3 and FIG. 4, the piezoelectric sensor 1 can cooperate with a monitoring system to achieve an all-round monitoring. The piezoelectric sensor 1 is coupled with a smart circuit of an analog-to-digital converter and a microcontroller unit, and is connected with a QRCode 3, and is placed in a vehicle 4 for transporting the goods, and is communicated with a cloud management system 5 via the Internet. After the logistics industry binds the piezoelectric sensor 1 to the outside of the packaging box 2, the packaging box 2 is stored at the logistics station and waits to be transported. Before shipment, the QRCode 3 on the outside of the packaging box 2 is scanned and then recoded in the cloud management system 5, while the smart circuit drives the power supply of the piezoelectric sensor 1 for sensing and monitoring. During the carrying and transportation of the goods, the sensing members 13 attached to the six end faces 22 of the packaging box 2 generate monitoring signals to be transmitted to the cloud management system 5 through the vehicle 4, so that the recipient and the sender can keep abreast of the condition of the goods and the goods can be delivered to the recipient safely. This way can prevent the goods from being broken and damaged because of being thrown or pressed heavily or being unsealed. When the goods are damaged, the information received by the cloud management system 5 and the time of receipt help the user understand when the goods are damaged in order to clarify the attribution of responsibility.

Thereby, the piezoelectric sensor of the present invention can achieve the following effects:

1. The piezoelectric sensor of the present invention is in the form of a ring and flexible. By stretching, the piezoelectric sensor can be fitted on the diagonal corners of the packaging box. The sensing members are attached to the respective end faces of the packaging box by a one-time operation, thereby simplifying the operation process and the operation time of the logistics staff.

2. The sensing members of the piezoelectric sensor of the present invention can be attached to the packaging box containing the goods by means of a binding operation, thereby realizing an all-round monitoring effect. In addition, the length of the piezoelectric sensor can be adjusted according to the needs. Therefore, the present invention can be widely applied to high-priced products, technology products, dangerous liquid bottles used in the laboratory, military confidential products or fragile products, reducing the probability that the goods are exchanged, damaged or destroyed. When the high-priced products are stolen, a back-end circuit of the piezoelectric sensor is directly connected with the police station to improve the efficiency of follow-up management.

3. The piezoelectric sensor of the present invention can be bound with a one-time operation to an article to be sold, and the piezoelectric sensor can be easily removed when the article is sold. When the piezoelectric sensor is removed, it will send an abnormal signal, thereby achieving an automated storage management.

4. The piezoelectric sensor of the invention can cooperate with the vehicle and the cloud management system to achieve an all-round monitoring. When the goods are damaged, the information received by the cloud management system and the time of receipt help the user understand when the goods are damaged in order to clarify the attribution of responsibility, thereby, enhancing the safety of goods and improving the tripartite mutual trust mechanism of the sender, the recipient and the logistics industry.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A stretchable piezoelectric sensor applied to logistics for real-time monitoring comprising a stretchable flexible substrate and a conductive layer formed on the flexible substrate, and the stretchable piezoelectric sensor is in the form of a ring, a plurality of sensing members corresponding to a number of end faces of a packaging box adhered to the conductive layer, when two ends of the piezoelectric sensor are stretched and fitted on diagonal corners of the packaging box, the sensing members are located on the respective end faces of the packaging box.

2. The stretchable piezoelectric sensor applied to logistics for real-time monitoring as claimed in claim 1, wherein the flexible substrate is a flexible printed circuit board.

3. The stretchable piezoelectric sensor applied to logistics for real-time monitoring as claimed in claim 1, wherein upper and lower end faces of the piezoelectric sensor are respectively enclosed with polyethylene terephthalate (PET) through an optical adhesive.

\* \* \* \* \*